US007757833B2

(12) United States Patent
Oie et al.

(10) Patent No.: US 7,757,833 B2
(45) Date of Patent: Jul. 20, 2010

(54) CURRENCY PROCESSING APPARATUS

(75) Inventors: Yoshiro Oie, Himeji (JP); Kazuyuki Shimizu, Himeji (JP); Hiroshi Tone, Himeji (JP); Takahiro Washizu, Himeji (JP); Ryuichi Tabata, Himeji (JP)

(73) Assignee: Glory Ltd., Hyogo-Ken (JP)

( * ) Notice: Subject to any disclaimer, the term of this patent is extended or adjusted under 35 U.S.C. 154(b) by 159 days.

(21) Appl. No.: 11/897,362

(22) Filed: Aug. 30, 2007

(65) Prior Publication Data
US 2008/0053786 A1 Mar. 6, 2008

(30) Foreign Application Priority Data
Sep. 1, 2006 (JP) ............... 2006-237621

(51) Int. Cl.
G07F 7/00 (2006.01)
G07F 9/04 (2006.01)
(52) U.S. Cl. ............... 194/206; 194/217; 705/22
(58) Field of Classification Search ........... 194/206, 194/217; 186/37
See application file for complete search history.

(56) References Cited

U.S. PATENT DOCUMENTS 4,883,158 A * 11/1989 Kobayashi et al. ......... 194/217

6,601,686 B1 * 8/2003 Ishida et al. ............... 194/202

FOREIGN PATENT DOCUMENTS

| DE | 103 22 383 A1 | 12/2004 |
| EP | 1 180 747 A1 | 2/2002 |
| EP | 1 220 169 A1 | 7/2002 |
| JP | 07 129859 | 5/1995 |
| JP | 11-213213 | 6/1999 |

OTHER PUBLICATIONS

European Patent Office Search Report (Date Jan. 28, 2009—6 pages).

* cited by examiner

Primary Examiner—Patrick Mackey
Assistant Examiner—Mark Beauchaine
(74) Attorney, Agent, or Firm—Renner, Kenner, Greive, Bobak, Taylor & Weber

(57) ABSTRACT

A currency processing apparatus, which includes a bill processing device for paying dispensing and depositing a bill, a coin processing device for paying dispensing and depositing a coin, and a stacked coin processing device for keeping a stacked coin, comprises inventory management means for administrating cash data of each of the devices, a memory for storing the cash data and remaining data, and controlling means for dispensing currencies deposited into the bill processing device and the coin processing device based on the remaining data stored in the memory and inventory amount in the coin-roll storing device.

7 Claims, 5 Drawing Sheets

CURRENCY PROCESSING APPARATUS

BACKGROUND OF THE INVENTION

The present invention relates to a currency processing apparatus, and more particularly, to a currency processing apparatus capable of remaining a predetermined amount of currencies based on cash of stacked coin processing device which manually replenishes and collect cash and cash of a bill processing device and a coin processing device.

In recent years, a currency processing apparatus which has a function of mechanically paying and receiving currency is used in a store. In such a currency processing apparatus, it is necessary to remain a predetermined amount of currencies for change before opening the store.

There is known a stacked coin processing device which stores stacked coin in which a given number of coins are wrapped and administrates cash. Such a stacked coin processing device is installed near the currency processing apparatus, and when coins for change run out, an operator manually replenishes stacked coin stored in the stacked coin processing device into the currency processing apparatus.

Japanese Patent Application Laid-open Publication No. 11-213213 discloses a currency paying and receiving processing system having a function of remaining a predetermined money amount. This currency paying and receiving processing system refers to accommodating part cash data of each denominations stored in an in-device cash memory 43, a set near empty number which is stored in a near empty setting memory 46, and a remaining money amount which is set in a remaining money amount setting memory 44, calculates a remaining processing calculation money amount by subtracting a secured remaining money amount from a designated remaining money amount, and obtains a currency constituting pattern for constituting the actually calculated remaining money amount using the minimum currency number (see paragraphs 0056 to 0064 of Japanese Patent Application Laid-open Publication No. 11-213213).

However, Japanese Patent Application Laid-open Publication No. 11-213213 obtains the currency constituting pattern based on the cash data of bills and coins, and a cash of the stacked coin is not taken into account. Therefore, when the secured remaining money amount runs out, an operator manually replenishes coins from the stacked coin processing device and collects a money amount (number) replenished from the stacked coin processing device.

As a result, the burden of the operator is increased, and a human-caused mistake is generated in some cases.

It is an object of the present invention to provide a currency processing apparatus capable of reducing the burden of an operator and a human-caused mistake when coins are replenished from a stacked coin processing device and capable of efficiently administrating cash and a remaining amount.

BRIEF SUMMARY OF THE INVENTION

According to the first aspect of the present invention, there is provided a currency processing apparatus including a bill processing device for dispensing and depositing a bill, a coin processing device for dispensing and depositing a coin, and a coin-roll storing device (stacked coin processing device) for keeping a coin-roll, comprising inventory managements (cash administrating means) for administrating inventory amount data of each of the devices, a memory for storing the inventory amount data and data regarding amount to be kept (remaining data), and controlling means for dispensing currencies deposited into the bill processing device and the coin processing device based on the data regarding amount to be kept stored in the memory and inventory amount in the coin-roll storing device.

DETAILED DESCRIPTION OF THE INVENTION

Embodiments of the present invention will be explained with reference to the drawings. The invention is not limited to the embodiments.

Embodiment 1

Figure 1:
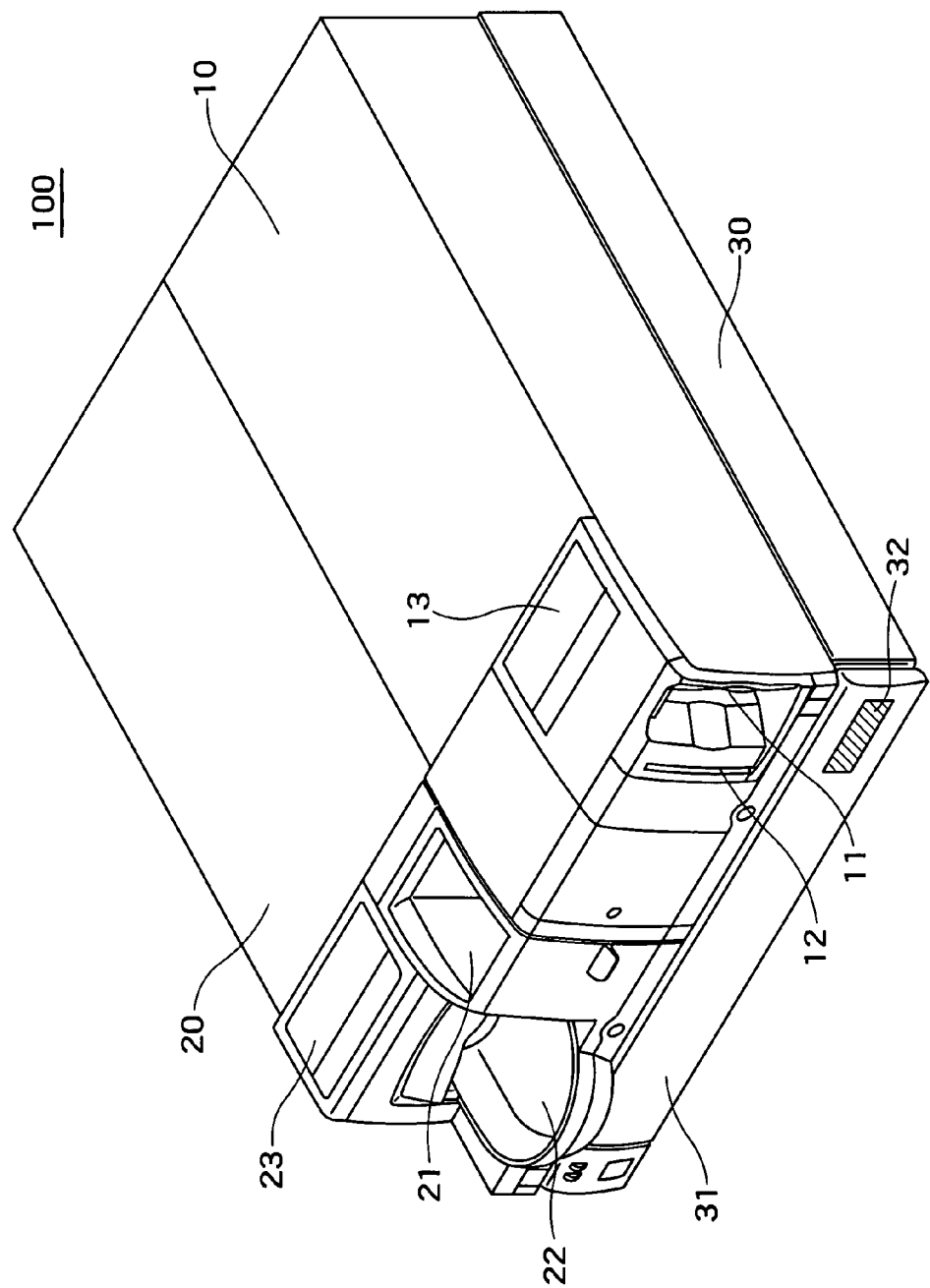
FIG. 1 illustrates a perspective view showing an outward appearance of a currency processing apparatus 100 according to the present invention.

FIG. 1 illustrates a perspective view showing an outward appearance of a currency processing apparatus 100 according to embodiment 1 of the present invention.

The currency processing apparatus 100 according to embodiment 1 of the present invention includes a bill processing device 10 for dispensing and depositing bills and a coin processing device 20 for dispensing and depositing coins which are placed on the coin-roll storing device (stacked coin processing device) 30.

The bill processing device 10, the coin processing device 20 and the coin-roll storing device 30 are electrically connected to each other, and they can send and receive data therebetween.

The bill processing device 10 comprises a bill inserting part 11, a bill outlet part 12 and an operating and displaying part 13.

Bills which are inserted from the bill inserting part 11 are classified into denominations and accommodated in the bill processing device 10.

The accommodated bills are brought out from the bill outlet part 12 when change is dispensed or bills are collected.

The coin processing device 20 comprises a coin inserting part 21 and a coin outlet part 22.

Coins inserted from the coin inserting part 21 are classified into denominations and accommodated in the coin processing device 20.

The accommodated coins are brought out from the coin outlet part 22 when change is dispensed or coins are collected.

The dispensing and depositing processing of the bill processing device 10 and the coin processing device 20 is mechanically carried out in accordance with predetermined control.

The coin-roll storing device 30 has an opening/closing part 31 which can open and close. Coin-roll is manually replenished to and taken out from the coin-roll storing device 30 by an operator unlike the bill processing device 10 and the coin processing device 20.

The bill processing device 10, the coin processing device 20 and the coin-roll storing device 30 comprise operating and displaying parts 13, 23 and 32, respectively. Instructions from an operator are received and information (e.g., a deposited or dispensed money amount or the like) is given to the operator through the operating and displaying parts 13, 23 or 32.

Figure 2:
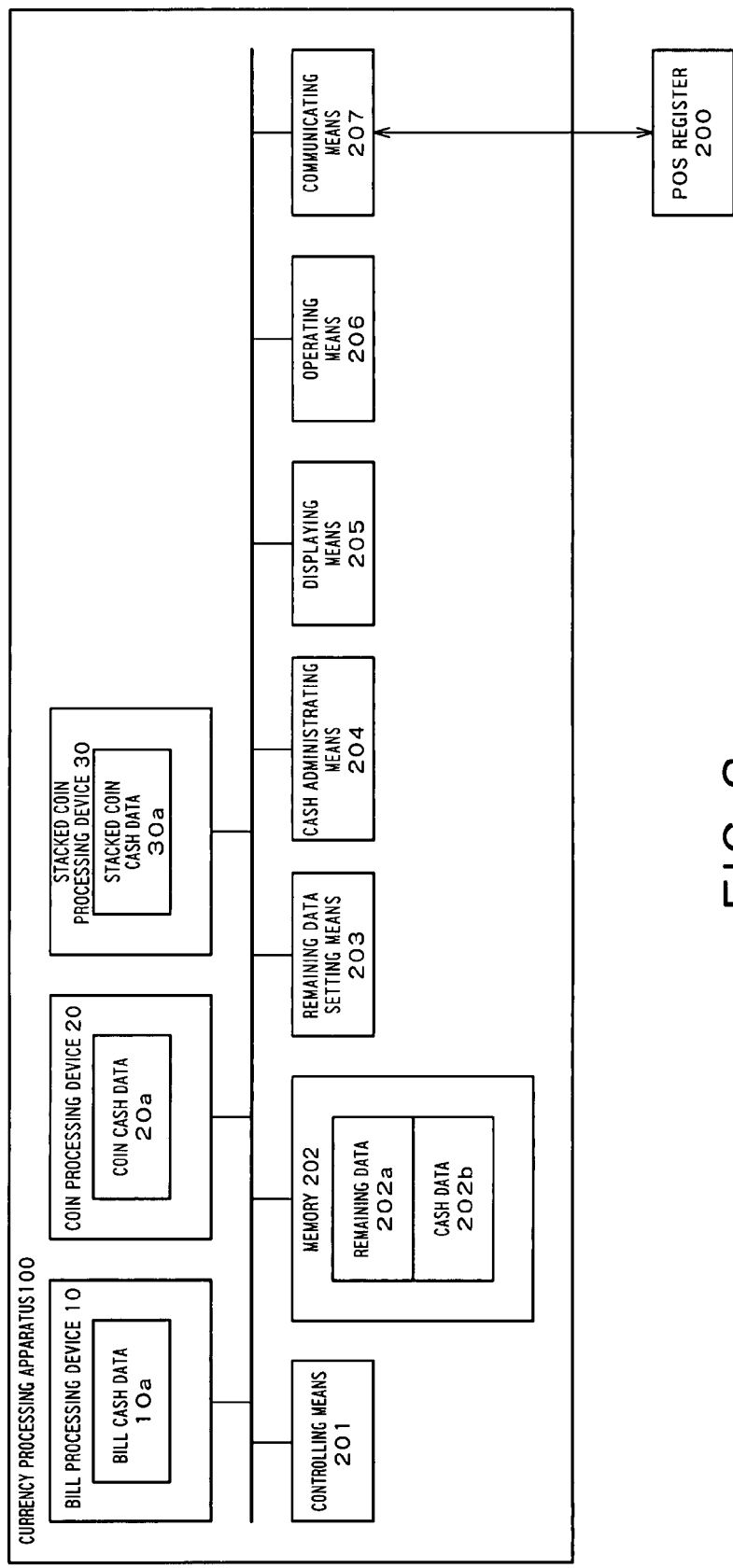
FIG. 2 illustrates a block diagram showing a structure of the currency processing apparatus 100 according to embodiment 1 of the present invention.

FIG. 2 illustrates a block diagram showing a structure of the currency processing apparatus 100 according to the embodiment 1 of the present invention.

The currency processing apparatus 100 according to embodiment 1 of the present invention comprises the bill processing device 10, the coin processing device 20, the coin-roll storing device 30, controlling means 201, a memory 202, data regarding amount to be kept setting means (remaining data setting means) 203, inventory management means (cash administrating means) 204, displaying means 205, operating means 206 and communicating means 207.

The bill processing device 10 stores bill inventory amount data (bill cash data) 10$a$ in an internal memory.

The coin processing device 20 stores coin inventory amount data (coin cash data) 20$a$ in an internal memory.

The coin-roll storing device 30 stores coin-roll inventory amount data (stacked coin cash data 30$a$ in an internal memory.

The inventory amount data 10$a$ to 30$a$ are total numbers of a total amount and currency aggregate on the basis of denominations.

The controlling means 201 gives instructions to the devices 10 to 30 and means 202 to 207 and sends and receives data to and from the devices 10 to 30 and means 202 to 207 based on the predetermined processing procedure.

The memory 202 can store data regarding amount to be kept (remaining data) 202$a$ and inventory amount data 202$b$.

The data regarding amount to be kept setting means 203 sets a remaining money amount or the remaining bills and coins on the basis of denominations in accordance with instructions which are input through the operating means 206, and writes the same to the memory 202 as data regarding amount to be kept 202$a$.

The inventory management means 204 summarizes individual inventory amount in the devices 10 to 30, summarizes the total amount inventory amount and the total number currencies on the basis of denominations, and writes the same to the memory 202 as the inventory amount data 202$b$.

The displaying means 205 shows a predetermined message on any of a display part (e.g., liquid crystal display) of the POS register 200 or the operating and displaying parts 13, 23 and 32.

The operating means 206 receives input of instructions (e.g., instructions to set a remaining mode for remaining a predetermined amount or a predetermined number of currencies) from an operator through any of an operating part (e.g., keyboard) of the POS register 200 or the operating and displaying parts 13, 23 and 32.

The communicating means 207 sends and receives data to and from the POS register 200.

For example, the controlling means 201 is a CPU (Central Processing Device), the memory 202 is a computer readable storage media such as a hard disk, and the communicating means 207 is a cable or radio data communication interface.

For example, the data regarding amount to be kept setting means 203, the inventory management means 204, the displaying means 205 and the operating means 206 are software modules which are realized by software executed by the controlling means 201.

Figure 3:
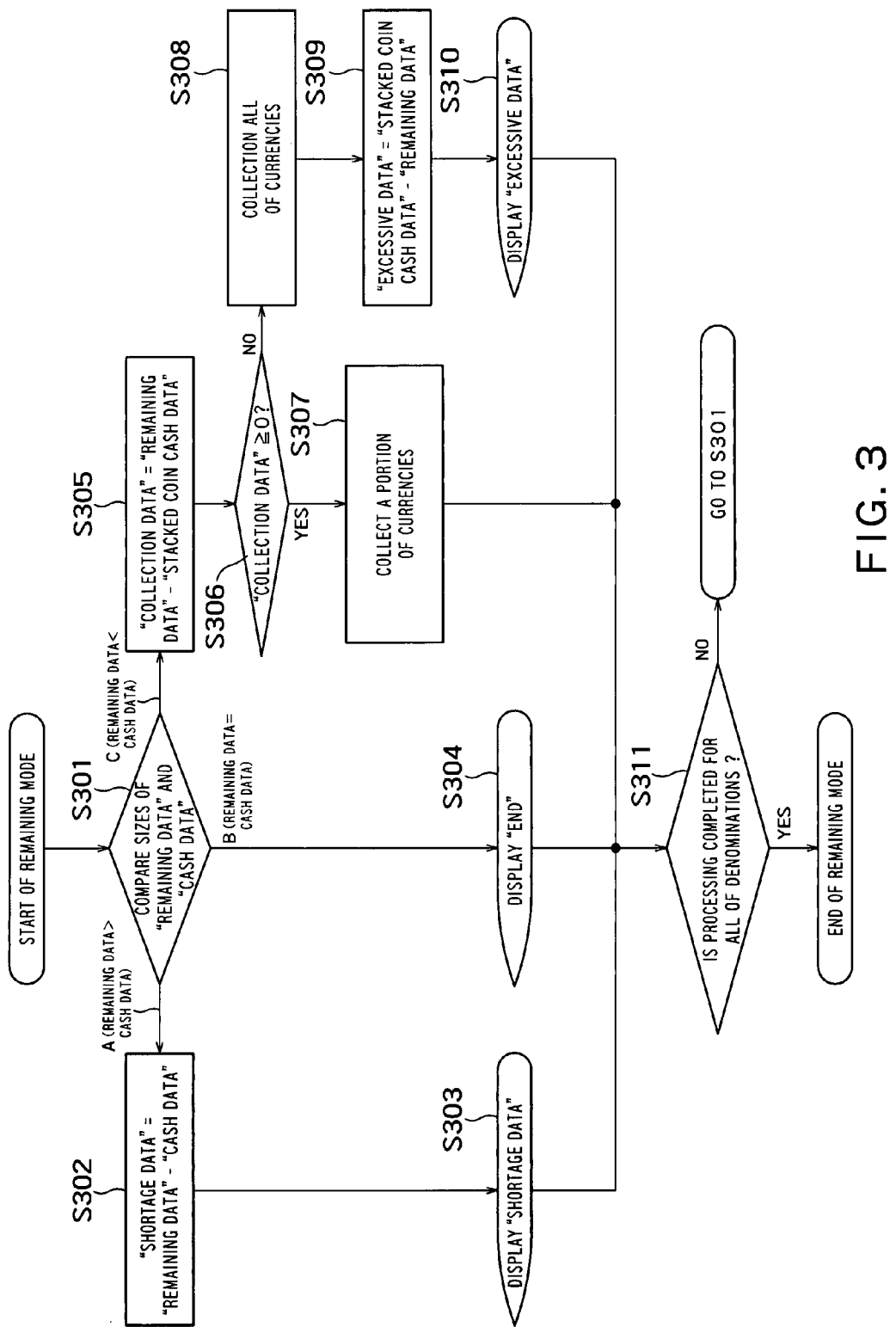
FIG. 3 illustrates a flowchart showing a processing procedure of controlling means 201 according to embodiment 1 of the present invention when a remaining mode is set.

FIG. 3 illustrates a flowchart showing processing procedure of the controlling means 201 according to the embodiment 1 of the present invention when a remaining mode is set.

First, size of the remaining data amount to be kept 202$a$ and size of the inventory amount data 202$b$ stored in the memory 202 are compared with each other (S301).

When the data regarding amount to be kept 202$a$ is greater than the inventory amount data 202$b$ (S301-A), a difference (shortage data) between the data regarding amount to be kept 202$a$ and the inventory amount data 202$b$ is calculated (S302).

Figure 5:
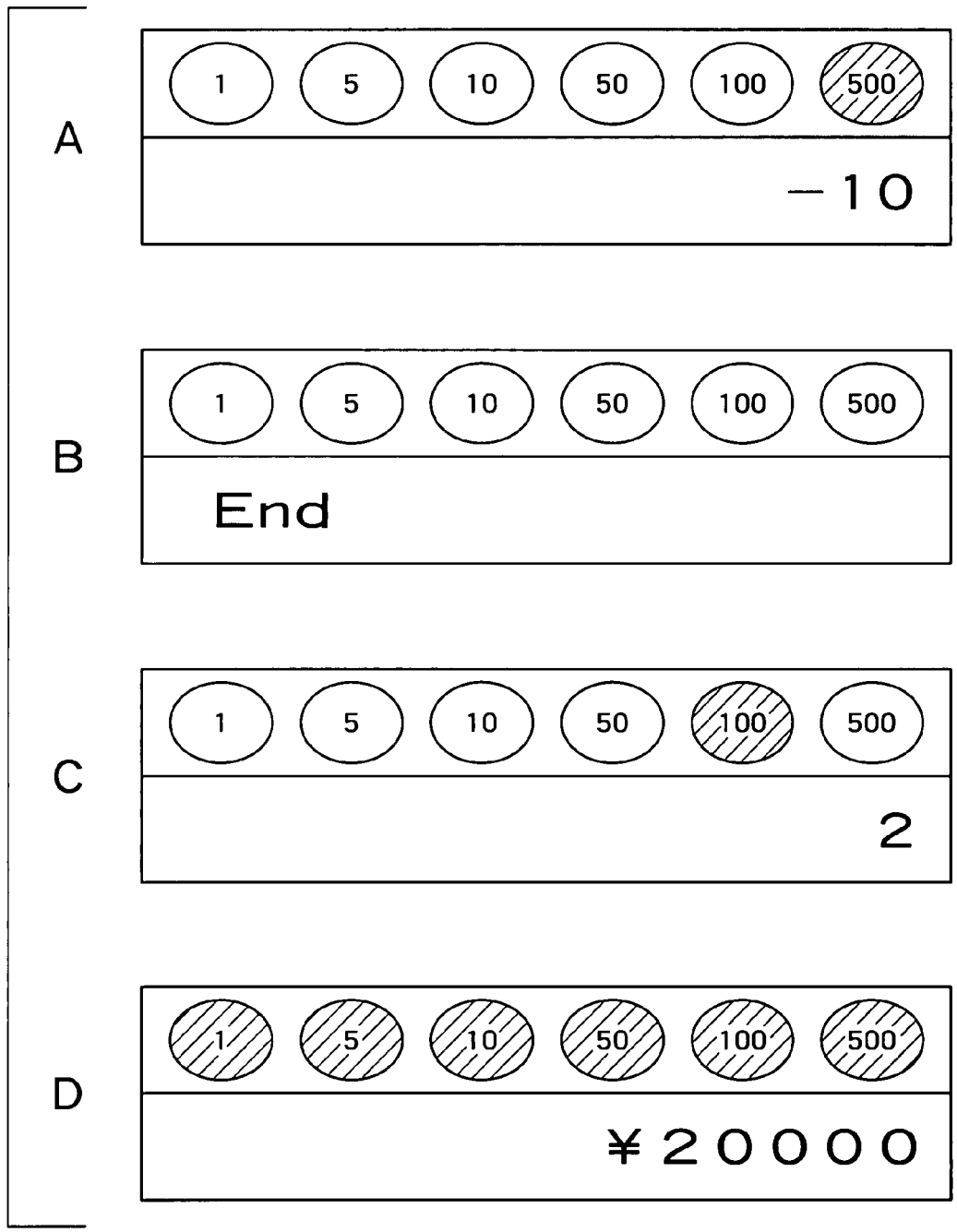
FIGS. 5A to D illustrate a schematic diagram showing display examples shown by displaying means 205 and 416.

Then, the shortage data is displayed on the operating and displaying part 32 (S303). At that time, a lamp indicating a lack of coin-roll lights up as shown in FIG. 5A, and the number of coins is displayed. FIG. 5A shows a lack of ten sets of coin-roll of 500 Yen coins.

When the data regarding amount to be kept 202$a$ and the inventory amount data 202$b$ match with each other (S301-B), a message that the processing is completed is displayed on the operating and displaying part 32 (S304). At that time, a message "END" is displayed as shown in FIG. 5B.

When the data regarding amount to be kept 202$a$ is smaller than the inventory amount data 202$b$ (S301-C), a difference (collection data) between the data regarding amount to be kept 202$a$ and the coin-roll inventory amount data 30$a$ is calculated (S305).

Then, it is determined whether the collection data is equal to or greater than 0 (S306).

When the collection data is equal to or greater than 0, i.e., when the data regarding amount to be kept 202$a$ is equal to or greater than the coin-roll inventory amount data 30$a$ (S306—Yes), a portion (amount corresponding to the collection data) of currencies accommodated in the bill processing device or coin processing device are collected (S307).

On the other hand, when the collection data is smaller than 0, i.e., when the data regarding amount to be kept 202$a$ is smaller than the coin-roll inventory amount data 30$a$ (S306—No), all of currencies accommodated in the bill processing device or coin processing device are collected (S308).

Then, a difference (excessive data) between the coin-roll inventory amount data 30$a$ and the data regarding amount to be kept 202$a$ is calculated (S309).

Then, the excessive data is displayed on the operating and displaying part 32 (S310). At that time, as shown in FIG. 5C, a lamp indicating a kind of the excessive coin-roll lights up, and the number of coins is indicated. FIG. 5C shows a lack of two sets of coin-roll of 100 Yen coins.

Here, the collecting processing (S307 and S308) of currencies is realized by dispensing currencies corresponding to the collection data or all of currencies from the bill outlet part 12 or the coin outlet part 22.

The processing shown in S301 to S310 is carried out on the basis of denominations of the bill and coin, and when processing of all of denominations is completed (S311-Yes), the flowchart shown in FIG. 3 is completed.

The processing shown in S301 to S310 may be carried out for the number of currencies or a money amount of currencies.

For example, the processing is carried out for the number of currencies, the data regarding amount to be kept 202$a$, the inventory amount data 202$b$, the bill inventory amount data 10$a$, the coin inventory amount data 20$a$ and the coin-roll inventory amount data 30$a$ include information concerning the number of currencies, and information shown in FIGS. 5A to C are indicated on the operating and displaying part 32.

When the processing is carried out for the money amount of currencies, the data regarding amount to be kept 202$a$, the inventory amount data 202b, the bill inventory amount data 10a, the coin inventory amount data 20a and the coin-roll inventory amount data 30a include money amount information of currencies, and information shown in FIG. 5B or D is indicated on the operating and displaying part 32.

In FIG. 5D, all of lamps showing kinds of coin-roll light up, and a lacking amount is indicated. FIG. 5D shows that "excessive data=¥20000", i.e., that "¥20000 should be collected from the coin-roll stored in the coin-roll storing device 30".

According to embodiment 1 of the present invention, the size of the data regarding amount to be kept 202a and the size of the inventory amount data 202b, including the coin-roll inventory amount data 30a, are compared with each other, currencies are collected in accordance with the result of the comparison, and predetermined messages are indicated, and the size of the data regarding amount to be kept 202a and the size of the coin-roll inventory amount data 30a are compared with each other, currencies are collected in accordance with a result of the comparison, and predetermined messages are indicated. As a result, the burden of an operator and a human-caused mistake concerning the remaining operation and cash summarizing operation, including the coin-roll cash, can be reduced.

Embodiment 2

In the embodiment 1 of the present invention, the currency processing apparatus 100 comprises the memory 202, the data regarding amount to be kept setting means 203, the inventory management means 204, the displaying means 205 and the operating means 206, but in an embodiment 2 of the present invention, the POS register 200 comprises the above means 202 to 206.

Figure 4:
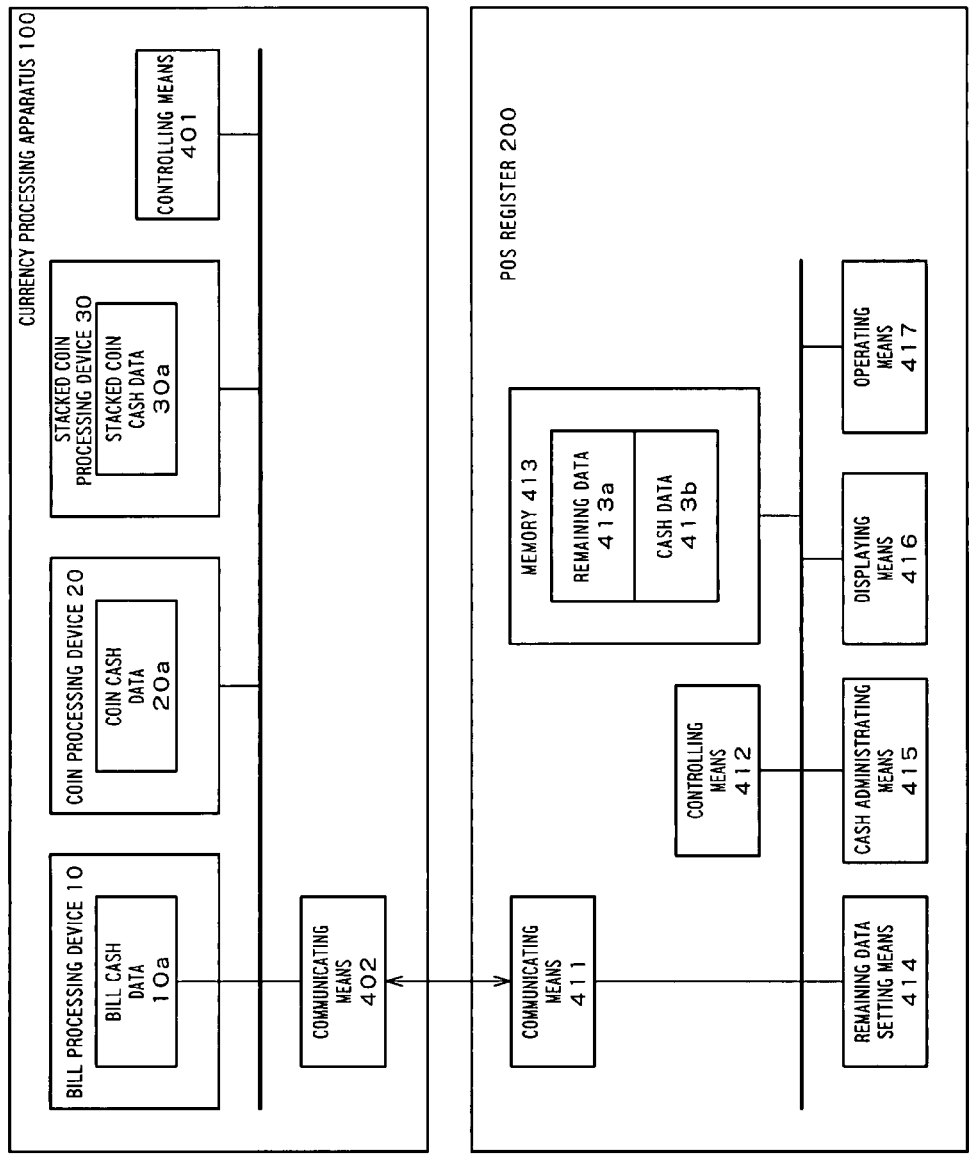
FIG. 4 illustrates a block diagram showing functions of the currency processing apparatus 100 and a POS register 200 according to an embodiment 2 of the present invention.

FIG. 4 illustrates a block diagram showing structures of the currency processing apparatus 100 and the POS register 200 of the embodiment 2 of the present invention. Explanation of the same structures as those of the embodiment 1 of the present invention will be omitted.

The currency processing apparatus 100 according to the embodiment 2 of the present invention includes the bill processing device 10, the coin processing device 20 and the coin-roll storing device 30, and comprises controlling means 401 and communicating means 402. According to embodiment 2 of the present invention, the currency processing apparatus 100 invention can be connected to the POS register 200 through the communicating means 402.

The POS register 200 according to the embodiment 2 of the present invention comprises communicating means 411, controlling means 412, a memory 413, data regarding amount to be kept setting means (remaining data setting means) 414, cash administrating means 415, displaying means 416 and operating means 417. The POS register 200 according to embodiment 2 of the present invention can be connected to the currency processing apparatus 100 through connecting means 411.

The controlling means 401 of the currency processing apparatus 100 according to the embodiment 2 of the present 20 invention instructs the devices 10 to 30 and sends and receives data to and from the devices 10 to 30 based on the predetermined processing procedure. The controlling means 401 sends and receives data to and from the POS register 200 according to the embodiment 2 of the present invention through the communicating means 402.

The controlling means 412 of the POS register 200 according to the embodiment 2 of the present invention instructs the means 413 to 417 and sends and receives data to and from the means 413 to 417 based on the predetermined processing procedure. The controlling means 412 sends and receives data to and from the currency processing apparatus 100 according to embodiment 2 of the present invention through the communicating means 411.

According to embodiment 2 of the present invention, since the POS register 200 has the means 411 to 417, the currency processing apparatus 100 can be reduced in size.

What is claimed is:

1. A currency processing apparatus including comprising:
a bill processing device that dispenses and deposits a bill;
a coin processing device that dispenses and deposits a coin;
a coin-roll storing device that stores a coin-roll in which a given number of coins are wrapped;
a memory that stores inventory amount data of each of the devices and data regarding amount to be kept; and
a controlling unit that dispenses currencies in the bill processing device and the coin processing device, based on the data regarding amount to be kept stored in the memory and the inventory amount data in the coin-roll storing device.

2. The currency processing apparatus according to claim 1, further comprising a display part that displays predetermined information, wherein the controlling unit switches information displayed on the display part based on the data regarding amount to be kept and the inventory amount data stored in the memory.

3. The currency processing apparatus according to claim 2, further comprising an inventory management unit that summarizes the inventory amount data of each of the devices, wherein when the data regarding amount to be kept stored in the memory is greater than that summarized inventory amount data, the controlling unit displays, on the display part, a difference between the data regarding amount to be kept and the inventory amount data.

4. The currency processing apparatus according to claim 2, wherein when the data regarding amount to be kept stored in the memory is smaller than the inventory amount in the coin-roll storing device, the controlling unit displays, on the display part, a difference between the inventory amount and the data regarding amount to be kept.

5. The currency processing apparatus according to claim 1, wherein when the data regarding amount to be kept stored in the memory is smaller than the inventory amount in the coin-roll storing device, the controlling unit dispenses all of currencies in the bill processing device or the coin processing device.

6. The currency processing apparatus according to claim 1, further comprising a communicating unit that communicates with a POS register.

7. The currency processing apparatus according to claim 1, wherein the data regarding amount to be kept stored in the memory and the inventory amount data of each of the devices are information indicating a number of currencies or a money amount.

* * * * *